(12) United States Patent
Sumida et al.

(10) Patent No.: US 6,744,705 B1
(45) Date of Patent: Jun. 1, 2004

(54) OPTICAL DISC RECORDING AND REPRODUCING APPARATUS

(75) Inventors: Katsutoshi Sumida; Masanobu Shimizu; Kazuhiro Teshirogi, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 238 days.

(21) Appl. No.: 09/598,152

(22) Filed: Jun. 21, 2000

(30) Foreign Application Priority Data

Jun. 22, 1999 (JP) .......................... 11-174996

(51) Int. Cl.⁷ ................................ G11B 7/00
(52) U.S. Cl. ................. 369/44.11; 369/94; 369/44.25; 369/44.26; 369/44.35
(58) Field of Search .................. 369/94, 44.11, 369/44.15, 44.26, 44.54, 44.35

(56) References Cited

U.S. PATENT DOCUMENTS

| | | | | |
|---|---|---|---|---|
| 5,831,952 A | * | 11/1998 | Yamada et al. | 369/44.25 |
| 6,101,157 A | * | 8/2000 | Bradshaw et al. | 369/44.35 |
| 6,307,820 B2 | * | 10/2001 | Takeya et al. | 369/44.25 |
| 6,434,094 B2 | * | 8/2002 | Yamada et al. | 369/44.25 |

FOREIGN PATENT DOCUMENTS

| | | |
|---|---|---|
| EP | 0294490 | 12/1988 |
| EP | 0910079 | 4/1999 |
| EP | 0987704 | 3/2000 |
| JP | 3-181062 | 8/1991 |
| JP | 9219056 | 8/1997 |

OTHER PUBLICATIONS

An English Language abstracts of JP9–219056.
English Language Abstract of JP 3–181062.

* cited by examiner

*Primary Examiner*—Nabil Hindi
(74) *Attorney, Agent, or Firm*—Greenblum & Bernstein, P.L.C.

(57) ABSTRACT

An optical disc recording and reproducing apparatus is provided. The apparatus detects the level of a focus error signal output from an optical pickup and a peak of the focus error signal occurred before the focus is obtained while an objective lens of the optical pickup moves in the focusing direction, discriminates a type of the loaded optical disc based on a first reference level or a second reference level, and actuates a focus servo before the objective lens moving in the focusing direction reaches a focalized position. Thus, a read only disc or a recordable disc can be rapidly reproduced.

9 Claims, 5 Drawing Sheets

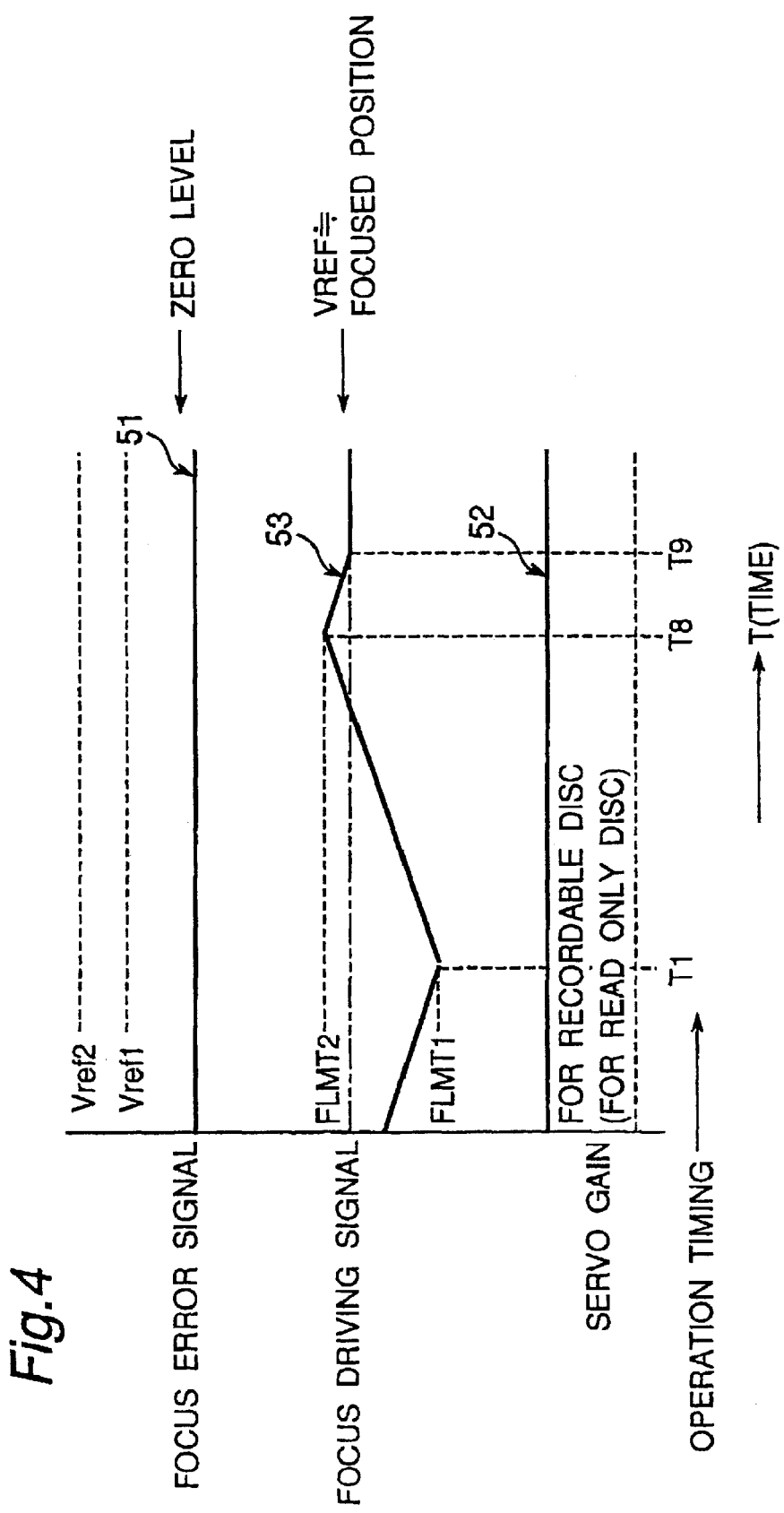

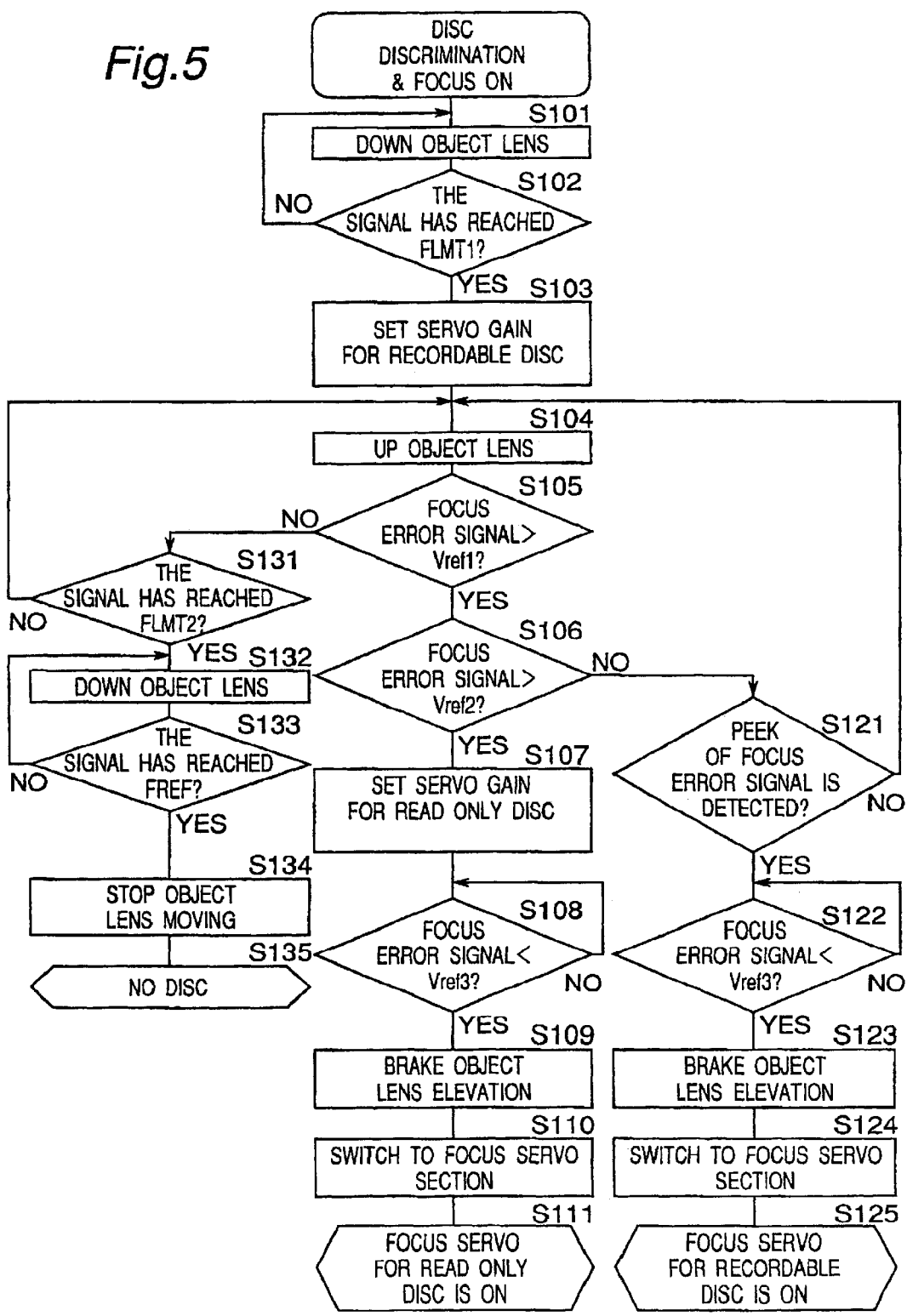

OPTICAL DISC RECORDING AND REPRODUCING APPARATUS

This application is based on application No. 11-74996 filed in Japan, the contents of which is incorporated herein by reference.

BACKGROUND OF THE INVENTION

1. Technical Field of the Invention

The present invention relates to an apparatus for recording and reproducing data to or from an optical disc, or more specifically, to apparatus discriminating a read only optical disc from a recordable optical disc to perform a suitable reproducing processing dependent on a type of the optical disc.

2. Related Art

In recent years, there have widely been provided a minidisc (MD) recorder, an MD player and the like which can record and reproduce information data by using, as an optical disc, for example a minidisc to be one of writable optical magneto discs.

The MD recorder and the MD player are optical disc recording and reproducing apparatuses which can reproduce both a read only optical disc and a recordable optical disc in the same manner as a compact disc (CD) player and the like.

A first conventional example of such an apparatus, the apparatus is generally known, which discriminates whether an optical disc is a read only optical disc or a recordable optical disc by a sensor hole provided on a cartridge of the optical disc, and switches automatically an operation corresponding to the type of the optical disc for reproducing data.

As a second conventional example of the optical disc recording and reproducing apparatus, an optical disc recording and reproducing apparatus has been disclosed in Japanese Patent Laid-Open Publication No. 3-181062. The apparatus notices a difference in a reflectance on each recording plane of a read only optical disc and a recordable optical disc. The apparatus discriminates whether the optical disc is the read only optical disc or the recordable optical disc based on a difference in a peak level of a reproducing RF signal which is a detection output from the optical pickup. The optical pickup is obtained when an objective lens of an optical pickup is forcibly moved in the direction of an optic axis, that is, when the forcible movement is specifically carried out from a predetermined position beyond a focalized position. Then, the apparatus switches automatically operating conditions depending on the type of the optical disc.

However, each of the optical disc recording and reproducing apparatuses according to the first and second conventional examples has the following problems.

More specifically, in order to automatically switch the operating conditions corresponding to the type of the optical disc and to perform reproducing, it always needs to discriminate independently whether the optical disc is a read only optical disc or a recordable optical disc. In order to attach the optical disc and then reproduce the optical disc, it is required that the operation for discriminating the type of the optical disc should be separated from the operation for switching the operating conditions of the apparatus based on the result of the discrimination and the operations should be interlocked. Thus, timing management is required for each operation.

In the optical disc recording and reproducing apparatus according to the first conventional example, moreover, a detector is required for discriminating the type of the optical disc by using the sensor hole provided on the cartridge holding the optical disc. It causes an increase of the number of components and a cost. In addition, in the case of an optical disc recording and reproducing apparatus of a portable type, it is necessary to provide a space for the detector for discriminating the type of the optical disc, which obstructs a reduction in the size of the apparatus.

In the optical disc recording and reproducing apparatus according to the second conventional example, furthermore, the objective lens of the optical pickup should be passed through the focalized position once in order to discriminate the type of the optical disc. In reproducing operation, for both the read only optical disc and the recordable optical disc, it is necessary to forcibly move the objective lens of the optical pickup toward the focalized position again, and perform the focus servo. Consequently, it takes a long time from the operation for specifying the reproducing operation by a user to the start of the reproducing operation of the is optical disc.

The present invention solves the above-mentioned conventional problems. It provides an optical disc recording and reproducing apparatus which can rapidly and reliably discriminate the status of attachment of an optical disc in an optional position on a disc without requiring a detector other than an optical pickup such as a detector for performing discrimination using a sensor hole provided on a cartridge of the optical disc. The apparatus, without a complicated structure, can also apply a focus servo on optimum operating conditions according to the type of read only and recordable optical discs to perform a reproducing operation simultaneously with the discrimination processing. The apparatus can also shorten a time required from the reproducing operation by a user to the start of the reproducing operation.

SUMMARY OF THE INVENTION

In order to solve the above-mentioned problems, the optical disc recording and reproducing apparatus according to the present invention is characterized in that the level of a focus error signal and a peak occurred before focus is obtained are detected while an objective lens is forcibly moved from a predetermined position toward the focalized position (where the focus is obtained), presence of the optical disc and a type of the optical disc (read only type/recordable type) are discriminated based on a certain level, and a focus servo is switched to start a reproducing processing before the objective lens which is being moved toward the focalized position reaches a focalized position when the result of the discrimination indicative of load of the optical disc is obtained.

According to the apparatus with the above described structure, it is possible to rapidly and reliably discriminate the status of load of an optical disc at any position on a disc without requiring a detector other than an optical pickup such as a detector for performing discrimination using a sensor hole provided on a cartridge of the optical disc and without making a structure complicated. It is also to apply a focus servo on optimum operating conditions according to the type of optical discs to perform a reproducing operation simultaneously with the discrimination processing, and to shorten a time required from the reproducing operation by a user to the start of the reproducing operation.

In a first aspect of the present invention, an optical disc recording and reproducing apparatus is provided for recording and reproducing data to an optical disc. The apparatus drives an objective lens in a direction of an optic axis, irradiates a light beam on the optical disc through the objective lens, actuates a focus servo to the objective lens in response to a focus error signal generated based on reflected light from a recording plane of the optical disc, thereby reproducing data recorded on the optical disc.

The apparatus comprises a gain setting section for setting a gain for the focus error signal, and a disc discriminating section for discriminating whether a type of the optical disc which is loaded in the apparatus is a recordable type or a read only type, and discriminating whether the optical disc is loaded in the apparatus.

The gain setting section sets the gain for the focus error signal to a first gain which is specified to a recordable type optical disc before the loaded optical disc is discriminated to be of either of a read only type or a recordable type by the disc discriminating section, and switches the gain of the focus error signal to a second gain which is specified to an read only type optical disc when the optical disc is discriminated to be of the read only type by the disc discriminating section.

While the objective lens is moving toward a focalized position, the disc discriminating section detects a level of the focus error signal and a peak of the focus error signal occurred before focus is obtained, and compares the detected level with a first reference level and a second reference level to discriminate that the optical disc is of the recordable type when the focus error signal exceeds the first reference level and reaches the peak without exceeding the second reference level, and that the optical disc is of the read only type when the focus error signal exceeds the second reference level.

When the disc discriminating section discriminates that the optical disc is loaded, the focus servo is actuated so as to focus a light spot on the recording plane of the optical disc based on the focus error signal before the objective lens moving toward the focalized position reaches a focalized position.

In a second aspect of the invention, an apparatus for recording and reproducing data for an optical disc comprises an optical pickup, a focus driver, a focus error signal generator, a focus servo section, an objective lens moving section, a disc discrimination section, and a gain setting section.

The optical pickup irradiates light beam on an optical disc through a built-in objective lens and detecting reflection light from a recording plane of the optical disc to reproduce information recorded on the optical disc.

The focus driver drives the objective lens of the optical pickup in a direction of an optic axis.

The focus error signal generator generates a focus error signal from an output of the optical pickup.

The focus servo section controls the focus driver such that the light spot is focused on the recording plane of the optical disc in response to the focus error signal.

The objective lens moving section controls the focus driver to forcibly move the objective lens.

The disc discrimination section discriminates presence of the optical disc loaded in the apparatus and discriminating whether the loaded optical disc to be of a recordable type or a read only type based on a level of the focus error signal and predetermined levels, and switches control to the focus driver between control by the objective lens moving section and control by the focus servo section.

The gain setting section sets a gain for the focus error signal to a first gain which is specified for a recordable type optical disc before the optical disc is discriminated to be of either of the read only type or the recordable optical type, and switches the gain for the focus error signal to a second gain which is specified to the read only optical disc when the optical disc is discriminated to be of the read only type, by the disc discriminating section.

The disc discriminating section has functions of detecting the level of the focus error signal and a peak of the focus error signal occurred before the focus is obtained, while the objective lens is moved from a first predetermined position toward the focalized position by the objective lens moving section, discriminating the loaded optical disc to be of the recordable type, when the level of the focus error signal exceeds a first reference level and reaches the peak level without exceeding a second reference level, discriminating the loaded optical disc to be of the read only type, when the level of the focus error signal exceeds the first reference level and exceeds the second reference level before reaching the peak, and discriminating no optical disc to be loaded, when the level of the focus error signal is smaller than the first reference level while the objective lens of the optical pickup is forcibly moved to a second predetermined position beyond the focalized position by the focus driver.

When the loaded optical disc is discriminated to be of either of the read only type or the recordable type, the control to the focus driver is switched to the control by the focus servo section before the focalized position is reached, and when no optical disc is discriminated to be loaded, the objective lens of the optical pickup is forcibly moved to a third predetermined position to stop.

According to above structures, the level of the focus error signal and the peak occurred before focus is obtained are detected while the objective lens is forcibly moved from the predetermined position in the focusing direction, the presence of the optical disc and the type of the disc (read only type/recordable type) are discriminated based on a certain level. When the result of the discrimination that the optical disc is loaded is obtained, the focus servo is switched to start the reproducing processing before the objective lens which is being moved in the focusing direction reaches the focalized position.

BRIEF DESCRIPTION OF THE DRAWINGS

A better understanding of the invention will be obtained by reproducing the description of the invention below, with reference to the following drawings, in which:

FIG. 4 is a timing chart showing a change in signals of a main part of the apparatus according to the invention when no optical disc is loaded; and FIG. 5 is a flowchart showing a whole processing of the apparatus according to the embodiment of the present invention.

DETAILED DESCRIPTION OF THE PREFERRED EMBODIMENTS

An optical disc recording and reproducing apparatus according to an embodiment of the present invention will be specifically described below with reference to the drawings.

Figure 1:
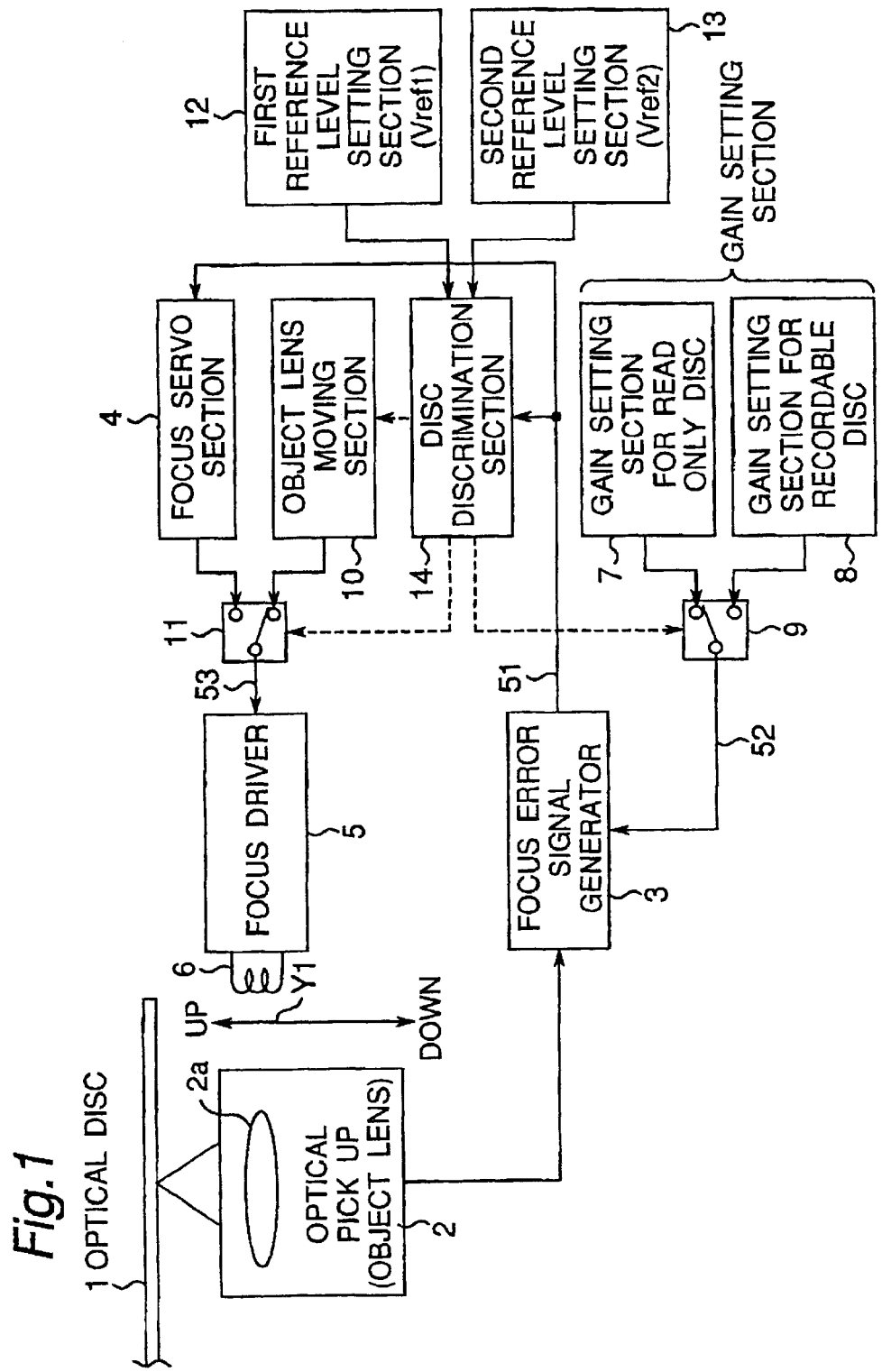
FIG. 1 is a block diagram showing the structure of an optical disc recording and reproducing apparatus according to an embodiment of the present invention.

FIG. 1 is a block diagram showing the structure of the optical disc recording and reproducing apparatus according to the present embodiment. In FIG. 1, an optical disc 1 is a read only type optical disc to which data can not be recorded (referred to as "read only optical disc") or a recordable type optical disc to which data can be recorded (referred to as "recordable optical disc"). An optical pickup 2 irradiates light (laser beam) through a built-in objective lens 2a, and detects light reflected from a recording plane on the optical disc 1 to reproduce information data recorded in the optical disc 1. A focus error signal generator 3 generates a focus error signal 51 from the output of the optical pickup 2. A focus servo section 4 focuses a light spot (not shown) sent from the optical pickup 2 on the recording plane of the optical disc 1 based on the focus error signal 51 obtained from the focus error signal generator 3. A focus driver 5 moves the objective lens provided in the optical pickup 2 in a direction Y1 of an optic axis. A focus actuator coil 6 causes a driving current to flow from the focus driver 5 to move the objective lens of the optical pickup 2 in the direction Y1 of the optic axis. A gain setting section 7 for read only disc is one of gain setting means for setting a gain for the focus error signal 51 obtained from the focus error signal generator 3 to a gain which is specified to the read only optical disc. A gain setting section 8 for recordable disc is another gain setting means for setting a gain for the focus error signal 51 obtained from the focus error signal generator 3 to a gain which is specified to the recordable optical disc. A gain selector 9 selects one of the gain setting sections 7 and 8 such that the focus error signal 51 obtained from the focus error signal generator 3 is set to the gain in the gain setting section 7 for read only disc, or to the gain in the gain setting section 8 for recordable disc. An objective lens moving section 10 controls forcible motion of the objective lens 2a in the optical pickup 2 upward (to approach the optical disc 1 in the direction Y1 of the optic axis of the objective lens) or downward (to get away from the optical disc 1 in the direction Y1 of the optic axis of the objective lens). A focus driving signal selector 11 selects an output from the focus servo section 4 or an output from the objective lens moving section 10 as a focus driving signal 53 to be sent to the focus driver 5. A first and a second reference level setting sections 12 and 13 set respectively first reference level (Vref1) and second reference level (Vref2) to be compared with the level of the focus error signal 51 sent from the focus error signal generator 3. A disc discrimination section 14, as disc discriminating means, controls the. gain selector 9 and the focus driving signal selector 11 to compare the level of the focus error signal 51 sent from the focus error signal generator 3 with each of the reference levels sent from the first reference level setting section 12 and the second reference level setting section 13, thereby discriminating the type of the optical disc 1 and controlling a timing to actuate or apply a focus servo to the optical pickup 2.

Moreover, signal 51 is a focus error signal, signal 52 is a gain setting signal for setting the focus error signal 51 to the gain which is specified to the read only optical disc or the recordable optical disc, and signal 53 is a focus driving signal.

The operation of the optical disc recording and reproducing apparatus having the above-mentioned structure will be described below.

Figure 2:
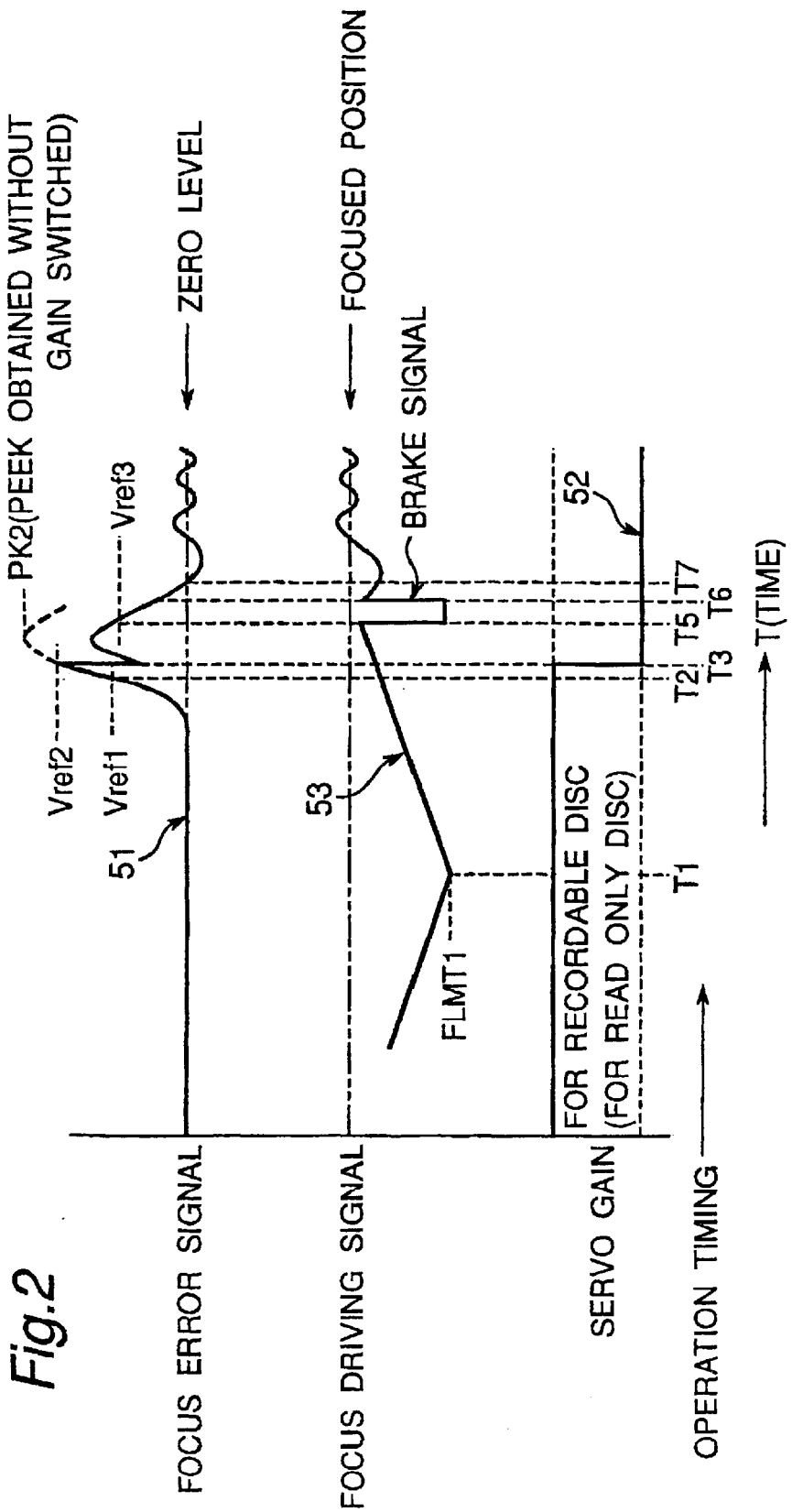
FIG. 2 is a timing chart showing a change in signals of a main part of the apparatus according to the invention when a read only optical disc is loaded.
Figure 3:
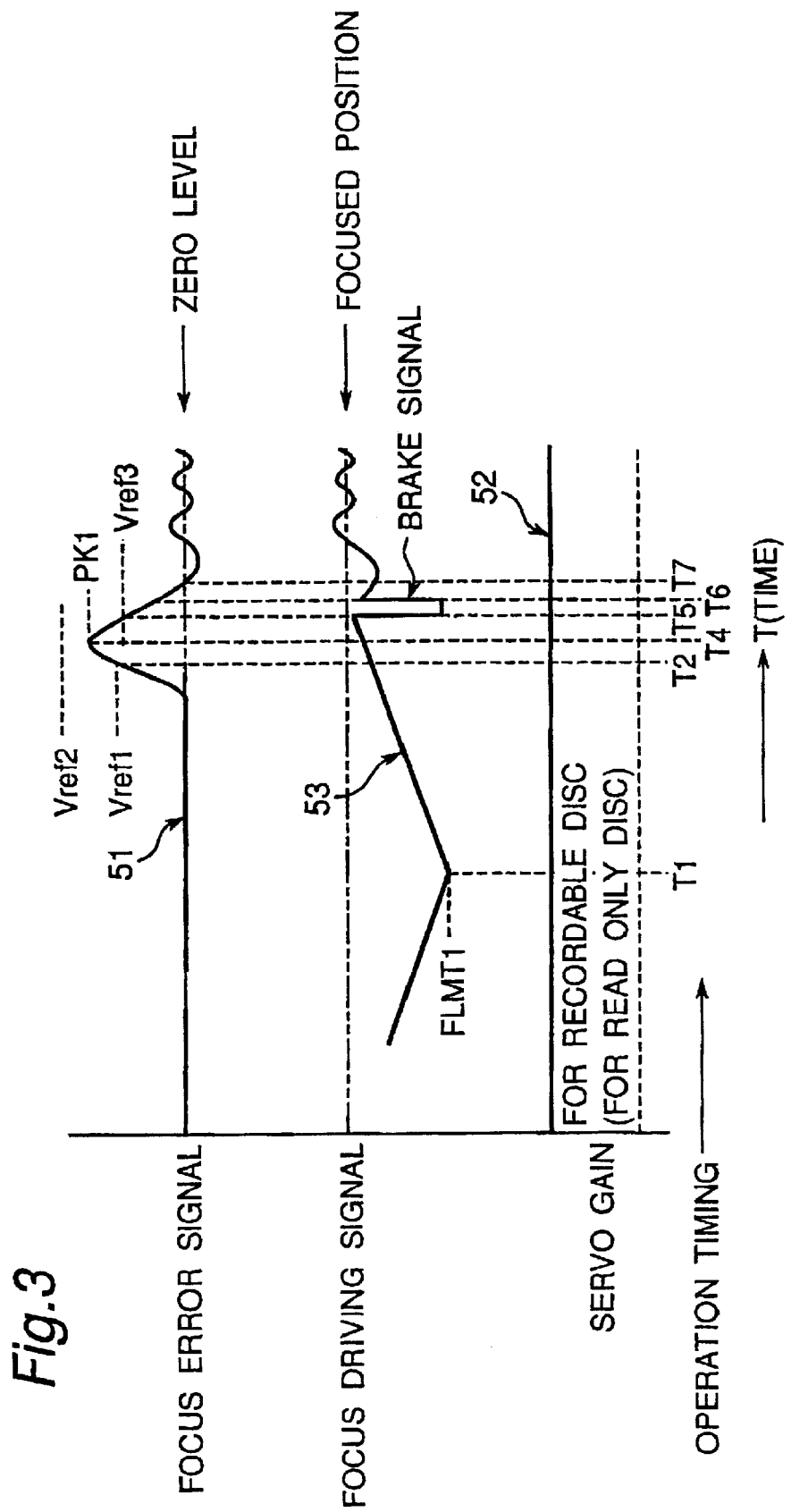
FIG. 3 is a timing chart showing a change in signals of a main part of the apparatus according to the invention when a recordable optical disc is loaded.

In the embodiment shown in FIG. 1, the present invention is applied to a minidisc (MD) recorder. FIGS. 2 to 4 are charts illustrating the situation of the operation in accordance with the type of each optical disc. FIG. 2 is a timing chart showing the operation in the case in which a read only optical disc is loaded. FIG. 3 is a timing chart showing the operation in the case in which a recordable optical disc is loaded. FIG. 4 is a timing chart showing the operation with no loaded disc. FIG. 5 is a flowchart showing a flow for a processing of discriminating the type of the optical disc to actuate a focus servo. Description will be given with reference to these drawings.

First of all, when a reproducing command is sent from a system controller (not shown) to the MD recorder, the optical disc 1 starts to be rotated at a predetermined speed by means of a spindle motor (not shown), and light (laser beam) is irradiated on the optical disc 1 from the optical pickup 2 through the objective lens 2a. Furthermore, the focus driving signal selector 11 is controlled to select an output from the objective lens moving section 10 by the disc discrimination section 14. The objective lens moving section 10 is simultaneously operated such that the objective lens 2a of the optical pickup 2 is forcibly moved downward. Consequently, the objective lens 2a of the optical pickup 2 starts the downward movement by causing a driving current to flow to the focus actuator coil 6 by the focus driver 5 (see Step S101 in FIG. 5).

When the objective lens 2a is moved downward to reach a first predetermined position (FLMT1) (each timing T1 of FIG. 2, 3 or 4, and YES of Step S102 in FIG. 5), the gain selector 9 selects a gain from the gain setting section 8 for a recordable disc in order to decide whether the loaded optical disc 1 is a read only disc. Thus the level of the focus error signal 51 obtained from the focus error signal generator 3 is switched to be a gain specified to the recordable optical disc. The objective lens moving section 10 is controlled to forcibly move the objective lens 2a upward by the disc discrimination section 14 such that the direction of the movement of the objective lens 2a is changed to upward and toward a focalized position (see Steps S103 and S104 in FIG. 5).

In the case in which the optical disc 1 is loaded, the output level of the focus error signal 51 sent from the focus error signal generator 3 is gradually changed as the objective lens 2a approaches the focalized position.

For a read only optical disc and a recordable optical disc, the output level of the focus error signal 51 sent from the focus error signal generator 3 makes a big difference due to a difference in a reflectance of a recording plane. In general, the read only optical disc has a higher reflectance than the recordable optical disc. Therefore, the focus error signal 51 output from the read only optical disc is higher than the focus error signal output from the recordable optical disc.

In the case in which the optical disc 1 is the read only optical disc, the level of the focus error signal 51 is preset to a gain specified to the recordable optical disc. As shown in FIG. 2, therefore, while the objective lens 2a is moved upward to approach the focalized position, the focus error signal 51 exceeds the first reference level (Vref1) (at timing T2 in FIG. 2), and furthermore the second reference level (Vref2) (at timing T3 in FIG. 2). In the case in which the optical disc 1 is the recordable optical disc, as shown in FIG. 3, the focus error signal 51 exceeds the first reference level (Vref1) (at timing T2 in FIG. 3) and reaches a peak level without exceeding the second reference level (Vref2) (at timing T4 in FIG. 3), as the objective lens 2a is moved upward to approach the focalized position.

In the present embodiment, the first reference level (Vref1) is preset to an intermediate level between the peak level of the focus error signal 51 for the recordable optical disc (PK1 of FIG. 3) and the level of the focus error signal 51 without loaded disc (a zero level of FIG. 3) in the state in which the focus error signal 51 is preset to a gain specified to the recordable optical disc. The second reference level (Vref2) is preset to an intermediate level between the peak level of the focus error signal 51 for the recordable optical disc (PK1 of FIG. 3) and the peak level of the focus error signal 51 for the read only optical disc (PK2 of FIG. 2) in the state in which the focus error signal 51 is set to the gain specified to the recordable optical disc.

In the case in which the optical disc 1 is the read only optical disc, while the objective lens is moved upward to approach the focalized position, the focus error signal 51 exceeds the first reference level (Vref1) (at the timing T2 in FIG. 2 and YES of Step S105 in FIG. 5) and further the second reference level (Vref2) (at the timing T3 in FIG. 2 and YES of Step S106 in FIG. 5). At this time, the disc discrimination section 14 determined that the optical disc 1 is the read only optical disc. Switching is carried out in such a manner that the gain selector 9 selects a gain from the gain setting section 7 for read only disc. Then the level of the focus error signal 51 obtained from the focus error signal generator 3 is set to the gain specified to the read only optical disc (Step S107 of FIG. 5).

When the gain is switched and the focus error signal 51 is then dropped to a predetermined level (Vref3) (at timing T5 in FIG. 2 and YES of Step S108 in FIG. 5), it is decided that the focalized position is approached and a braking operation is carried out to stop the movement of the objective lens 2a (Step S109 in FIG. 5) Then, the selection of the focus driving signal selector 11 is switched to an output sent from the focus servo section 4 (timing T6 in FIG. 2 and Step S110 in FIG. 5). Consequently, a focus servo is applied (Step S111 of FIG. 5) before the focalized position (at timing T7 in FIG. 5) is reached.

Moreover, in the case in which the optical disc 1 is the recordable optical disc, the objective lens 2a moves upward to approach the focalized position. The disc discrimination section 14 determines that the optical disc 1 is the recordable disc when it detects the focus error signal 51 which exceeds the first reference level (Vref1) (the timing T2 in FIG. 3 and YES in the Step S105 in FIG. 5) and reaches a peak level (the timing T4 of FIG. 3 and YES in Step S121 in FIG. 5) before reaching the second reference level (Vref2).

When the peak level is detected and the focus error signal 51 is then dropped to the predetermined level (Vref3) (timing T5 of FIG. 3 and YES of Step S122 in FIG. 5), it is decided that the focalized position is approached and a braking operation is carried out to stop the movement of the objective lens 2a (Step S123 of FIG. 5). Then, the focus driving signal selector 11 is switched to select an output sent from the focus servo section 4 (at timing T6 of FIG. 3 and Step S124 of FIG. 5). Consequently, a focus servo is applied before the focalized position (at timing T7 of FIG. 3) is reached (Step S125 of FIG. 5).

In the case in which the optical disc 1 is the read only or recordable optical disc, the type of the optical disc 1 is discriminated and the focus servo is exactly applied as described above. Next, the operation will be described in the case in which a reproducing command is sent from a system controller (not shown) with no loaded disc. In this case, the same processing from the Step S101 to the Step S105 shown in FIG. 5 as those in the recordable optical disc are executed. Therefore, the description of these operations will be omitted and subsequent different operations will be described with reference to FIGS. 4 and 5.

In the case in which the disc is not loaded, the focus error signal 51 does not exceed the first reference level (Vref1) (NO in the Step S105 in. FIG. 5) but exactly passes through the focalized position to reach a second predetermined position (FLMT2) (at timing T8 in FIG. 4 and YES in Step S131 in FIG. 5), although the objective lens 2a moves upward from the position of the FLMT1 to approach the focalized position. At this, time, the disc discrimination section 14 discriminates that no disc is loaded and operates the objective lens moving section 10 such that the objective lens 2a forcibly moves downward (Step S132 in FIG. 5).

Consequently, the objective lens 2a starts to move downward. When the objective lens 2a reaches a third predetermined position (FREF) (at timing T9 of FIG. 4 and YES in Step S133 in FIG. 5), the disc discrimination section 14 causes the objective lens moving section 16 to stop the forcible movement of the objective lens 2a (step S134 in FIG. 5) to bring the objective lens 2a into a stop-state, and sends the result indicative of no loaded disc to the system controller (not shown), thereby completing the operation (Step S135 in FIG. 5).

According to the present embodiment, as described above, the disc discrimination section 14 discriminates the disc load status which indicates whether the read only optical disc or recordable optical disc is loaded or not, based on the focus error signal 51 output from the optical pickup 2 through the focus error signal generator 3. When the optical disc is determined to be loaded by the result of the discrimination, the operation condition is switched in accordance with the focus servo operation and the type of the optical disc. After the completion of the switching, the reproducing processing can be started for the read only optical disc or the recordable optical disc. Consequently, it is possible to shorten a time from a user's. reproducing operation to the start of the reproducing operation.

Furthermore, it is not necessary to have a detector other than the optical pickup 2, such as a detector for discriminating the type of the optical disc 1 based on the sensor hole provided on the cartridge for protecting and holding the optical disc 1. In addition, the type of the optical disc 1 can be discriminated rapidly and reliably in an optional position on the disc 1.

In this embodiment, the description is made to the MD recorder/player which can record/reproduce data to/from the minidisc (MD), as an optical disc, which is one of writable magneto optical discs. The optical disc recording and reproducing apparatus however is not restricted to an apparatus using the minidisc (MD), but the present invention can be applied to a recorder or a player using a compact disc (CD), an NO, and other various types of optical discs capable of reproducing information on a recording plane of the disc by detecting reflection light on the recording plane obtained from laser beam irradiated through the objective lens.

According to the above described apparatus, the level of the focus error signal and the peak occurred before the focalized position are detected while the objective lens is forcibly moved from the predetermined position toward the focalized position. The presence of the optical disc, and the kind of the loaded optical disc (read only type/recordable type) are discriminated based on a predetermined level of the signal. When the discrimination result indicates that the optical disc is loaded, reproducing processing is started after switching to the focus servo before the objective lens moving toward the focalized position reaches the focalized position.

Consequently, it is possible to rapidly and reliably discriminate the loading status of the optical disc at any position on the disc without requiring a detector other than an optical pickup such as a detector for discriminating using the sensor hole provided on the cartridge of the optical disc and without making a structure complicated. Therefore, it is possible to apply a focus servo with optimum operating conditions in response to the type (read only/recordable) of optical disc to perform a reproducing processing simultaneously with the discrimination processing, and to shorten a time taken from the reproducing operation by a user to the start of the reproducing operation.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An apparatus for recording and reproducing data for an optical disc, the apparatus driving an objective lens in a direction of an optic axis, irradiating a light beam on the optical disc through the objective lens, and actuating a focus servo to drive the objective lens in response to a focus error signal generated based on reflected light from a recording plane of the optical disc, to reproduce data recorded on the optical disc, the apparatus comprising:

a gain setter that sets a gain for the focus error signal; and a disc discriminator that determines whether the optical disc is loaded in the apparatus and, when the optical disc is loaded, determines whether the optical disc is a recordable type or a read only type;

wherein the gain setter sets the gain for the focus error signal to a first gain, corresponding to the recordable type optical disc, before the loaded optical disc is determined to be one of the read only type or the recordable type by the disc discriminator, and switches the gain of the focus error signal to a second gain, corresponding to the read only type optical disc, when the optical disc is determined to be the read only type by the disc discriminator; and wherein, while the objective lens is moving toward a focus position, the disc discriminator detects a level of the focus error signal and a peak of the focus error signal before focus is obtained, and compares the detected level with a first reference level and a second reference level, the disc discriminator determining that the optical disc is the recordable type when the focus error signal level exceeds the first reference level and reaches the peak without exceeding the second reference level, and that the optical disc is the read only type when the focus error signal level exceeds the second reference level.

2. An apparatus for recording and reproducing data for an optical disc, the apparatus comprising:

an optical pickup that irradiates a light beam on an optical disc through an objective lens and detects a reflection light from a recording plane of the optical disc to reproduce information recorded on the optical disc;

a focus driver that drives the objective lens in a direction of an optic axis;

a focus servo that controls the focus driver such that the light beam is focused on the recording plane of the optical disc in response to a focus error signal;

an objective lens movement controller that controls the focus driver to move the objective lens;

a disc discriminator that discriminates whether the optical disc is loaded in the apparatus and whether the loaded optical disc is a recordable type or a read only type based on a level of the focus error signal, and that switches control of the focus driver between the objective lens movement controller and the focus servo; and a gain setting section for setting that sets a gain for the focus error signal to a first gain corresponding to the recordable type optical disc before the optical disc is discriminated to be one of the read only type or the recordable type, and that switches the gain for the focus error signal to a second gain corresponding to the read only type optical disc when the optical disc is discriminated to be the read only type;

wherein the disc discriminator detects the level of the focus error signal and a peak of the focus error signal before focus is obtained, while the objective lens is moved from a first predetermined position toward a focus position by the objective lens movement controller;

discriminates the loaded optical disc to be the recordable type, when the focus error signal level exceeds a first reference level and reaches the peak level without exceeding a second reference level;

discriminates the loaded optical disc to be the read only type, when the focus error signal level exceeds the first reference level and exceeds the second reference level before reaching the peak level; and discriminates no optical disc to be loaded, when the focus error signal level does not exceed the first reference level while the objective lens is moved to a second predetermined position beyond the focus position by the focus driver.

3. The apparatus for recording and reproducing data for an optical disc according to claim 1, wherein when the disc discriminator determines that the optical disc is loaded, the focus servo is actuated to focus a light spot on the recording plane of the optical disc based on the focus error signal before the objective lens reaches a focus position.

4. The apparatus for recording and reproducing data for an optical disc according to claim 2, wherein when the disc discriminator discriminates that the loaded optical disc is one of the read only type or the recordable type, the disc discriminator switches control of the focus driver to the focus servo before the focus position is reached.

5. The apparatus for recording and reproducing data for an optical disc according to claim 2, wherein when the disc discriminator discriminates that no optical disc is loaded, the objective lens movement controller controls the focus driver to move the objective lens to stop at a third predetermined position.

6. A method of identifying an optical disc for a recording and reproducing device, the recording and reproducing device comprising an objective lens configured to focus a light beam on the optical disc by moving along an optical axis to a focus position, the method comprising:

setting a gain of a focus error signal to a first gain, corresponding to a recordable type optical disc;

moving the objective lens along the optical axis from a first predetermined position toward the focus position;

detecting a level of the focus error signal as the objective lens moves along the optical axis;

when the focus error signal level peaks above a first reference level and below a second reference level before the objective lens reaches the focus position, determining that the optical disc is the recordable type optical disc; and when the focus error signal level peaks above the second reference level before the objective lens reaches the focus position, determining that the optical disc is a read only type optical disc and setting the gain of the focus error signal to a second gain corresponding to the read only type optical disc.

7. The method according to claim 6, further comprising:

when the focus error signal level peaks below the first reference level and the objective lens moves past the focus position, determining that the optical disc is not loaded in the recording and reproducing device.

8. The method according to claim 7, further comprising:

when the optical disc is determined to be not loaded, moving the objective lens to a predetermined stop position.

9. The method according to claim 6, further comprising:

when the optical disc is determined to be one of the recordable type or the read only type, focusing a light spot on the optical disc based on the focus error signal before the objective lens reaches the focus position.

* * * * *